United States Patent [19]
Danckwerth et al.

[11] Patent Number: 5,141,308
[45] Date of Patent: Aug. 25, 1992

[54] SEMICONDUCTOR LASER PULSE COMPRESSION RADAR SYSTEM

[76] Inventors: Thomas M. Danckwerth, 8 Palomino Dr., New Milford, Conn. 06776; Antonio C. Pires, 16 Cliffview Dr., Norwalk, Conn. 06851

[21] Appl. No.: 743,949

[22] Filed: Aug. 12, 1991

[51] Int. Cl.[5] .............................. G01C 3/08
[52] U.S. Cl. ...................................... 356/5
[58] Field of Search ........................ 356/4, 5

[56] References Cited

U.S. PATENT DOCUMENTS 4,211,485  7/1980  Koreicho ............................. 356/5
4,666,295  5/1987  Duvall, III et al. .................. 356/5

Primary Examiner—Mark Hellner
Attorney, Agent, or Firm—W. K. Denson-Low; W. J. Streeter; R. A. Hays

[57] ABSTRACT

A semiconductor laser pulse compression radar system utilizes a semiconductor laser source 16 for generating light for transmission towards a target 27. A modulator 15 pulses and modulates the light according to a preselected code, and a transmitter telescope 18 launches the light. Portions of the pulsed light reflected by the target 27 are gathered by a receiver telescope 28 and are converted to electrical current pulses by an avalanche photodiode 30. The pulses of electrical current are demodulated by demodulator 31, which includes a pulse compression filter 35 which has the conjugate time-frequency characteristic of the modulator. A display/counter 36 displays the range of the target from the system.

22 Claims, 1 Drawing Sheet

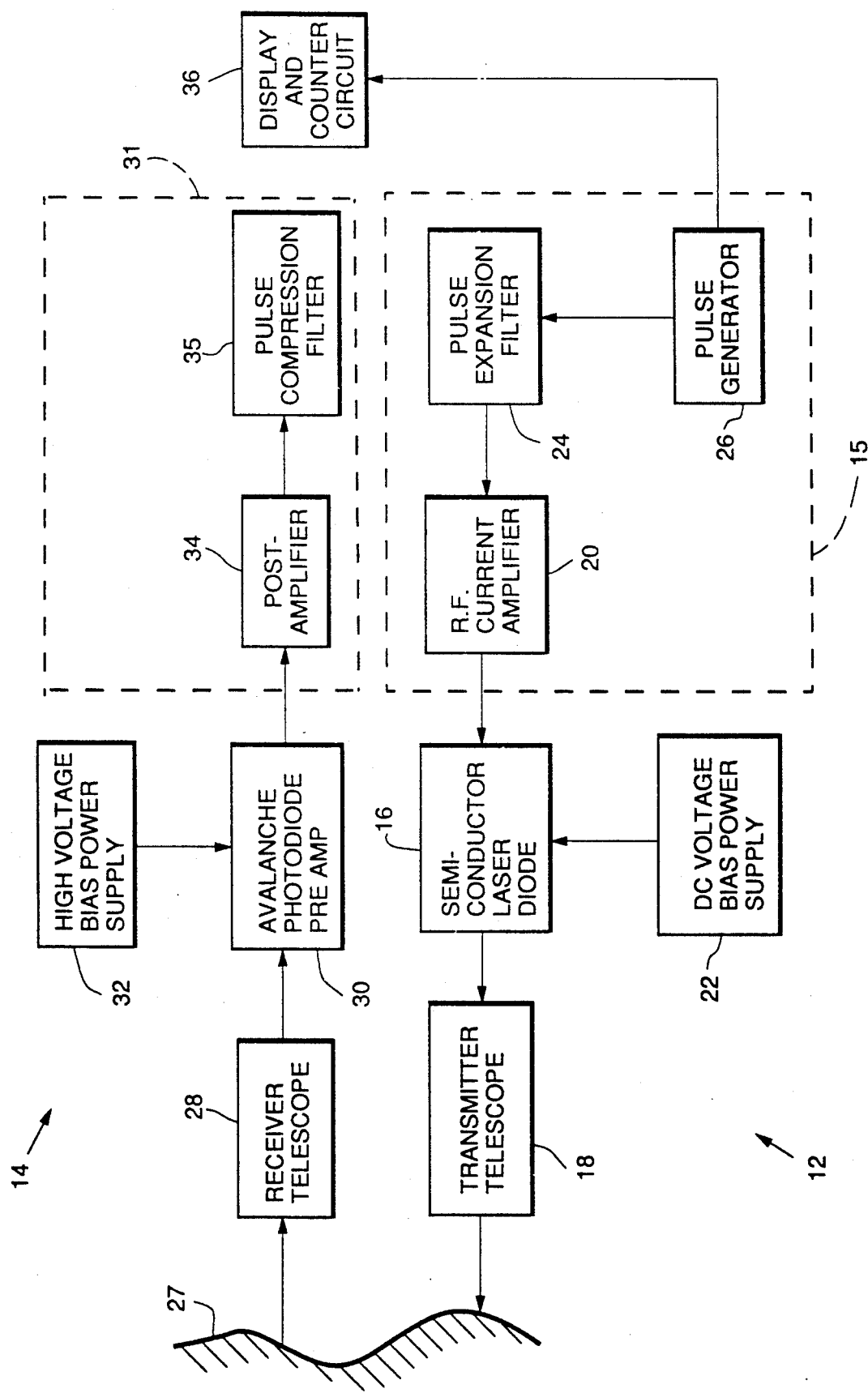

SEMICONDUCTOR LASER PULSE COMPRESSION RADAR SYSTEM

BACKGROUND OF THE INVENTION

1. Field of the Invention

The present invention relates to laser radar systems and more particularly to a semiconductor laser radar system which utilizes pulse compression techniques by respectively expanding and compressing the transmitted and received laser signals thereby extending the range performance of the semiconductor laser radar system.

2. Description of the Prior Art

Various methods are utilized for measuring the range of a target from a ranging system. For example, radio frequency (RF) radar ranging systems may be utilized. Radar ranging systems are of two general types: (1) continuous wave (CW); and (2) pulsed. A CW radar transmits a continuously modulated waveform and simultaneously listens for the reflected echoes. A pulsed radar transmits its radio waves in short pulses and listens for echoes in periods between transmissions. Each is relatively simple and can be extremely accurate.

For most long-range applications, radar of the pulsed-type is utilized. The principal reason is that with pulsed operation, one avoids the problem of the transmitter, via electrical noise, interfering with the receiver, which in turn limits range performance. Solutions to this problem, i.e., physical separation of the transmitter and receiver, are inappropriate because of space limitations in many systems, such as airborne radar. In addition, pulsed operation has a further advantage of simplifying the range measurement and receiver. If the transmit and echo pulses are adequately separated, a target's range can be precisely determined merely by measuring the elapsed time between the transmission of a pulse and the reception of the echo of that pulse.

In order to obtain both long detection range and fine range resolution, the transmission of extremely narrow pulses of exceptionally high peak power are required. But there are practical limits on the level of peak power one can use.

Pulse compression has been used in radar systems as a solution to this dilemma. In pulse compression, internally modulated pulses of sufficient width to provide the necessary average power at a reasonable level of peak power are "expanded" by modulation and then are transmitted. The received echoes are "compressed" by filters having the conjugate transfer function of the modulation.

The two most common methods of modulation are linear frequency modulation and binary phase modulation. Other methods include polyphase modulation and pulse code modulation.

Because of its parallel to the chirping of a bird, the linear frequency modulation method of coding was called "chirp" by its inventors. With chirp, the radio frequency of each transmitted pulse is increased at a constant rate throughout its length. The received echoes are passed through a filter which introduces a time lag that decreases linearly at exactly the opposite rate at which the transmitted pulses were modulated. Because the successive portions of the received echo tend to "bunch up" after passing through the filter, the filter "compresses" the pulse.

In binary phase modulation and polyphase modulation, as the names imply, the radio frequency phase of the transmitted pulses is modulated. In binary phase modulation, 0° and 180° increments are used, while in polyphase modulation, any number of different, harmonically related phases may be used.

With phase modulation, each transmitted pulse is, in effect, marked off into narrow segments of equal length. The radio frequency phase of certain segments is shifted by the selected increment, e.g., 180°, according to a predetermined code. The received echoes are passed through a delay line which provides a time delay exactly equal to the duration of the uncompressed pulses. Thus, as the trailing edge of echo enters the line, the leading edge emerges from the other end, thereby compressing the pulse.

In pulse code modulation (PCM), binary coding information, having optimal correlation properties, e.g., a Barker code, is transmitted within each pulse. The return pulses are cross correlated with the transmitted pulses, that is, the time integral of the product of the two signals, with one having a variable time delay, is taken, thereby resulting in compression of the pulse.

The use of the pulse compression technique simultaneously allows for both long detection range and fine range resolution without exceeding practical limits on the transmitter peak and average powers.

RF radar ranging systems are limited in detectable target size by the size of the RF radar beam used. Thus, RF radar ranging systems are generally not practicable for obstacle avoidance and aim point selection applications where the targets are of relatively small size and the antenna required for the detection of such small targets would be unreasonably large, particularly when such radar systems are used in an airborne application.

In order to detect relatively small targets, laser radar systems have been used because lasers may provide a sufficiently small beam having controlled divergence suitable for detecting these relatively small targets. Laser radar systems, like microwave radar systems, are of two general types: (1) CW; and (2) pulsed. An example of a CW laser radar system which is frequency-modulated is that illustrated by U.S. Pat. No. 4,721,385, issued Jan. 26, 1988, to Jelalian et al. As with conventional radar systems, pulsed laser radar systems are utilized for most applications.

Prior radar systems, whether RF or optical, have used the notion of coherent or heterodyned detection. In particular, RF radars exclusively use coherent detection. In coherent detection, the return echo is electronically mixed with a portion of a separate transmitter signal. The mixed signal provides a beat signal which, when demodulated, contains the target information.

Optical radars using pulse compression have, in the past, been limited to coherent detection to maximize range performance. Typically, utilizing coherent detection requires ultra frequency stable transmitters and high precision receiver detectors. Even with these high quality components, the coherent detection requires receiver video bandwidths which are very large fractions of the carrier. Since laser radars use optical frequency carriers at $10^{14}$ Hz, the receiver bandwidth is quite large, thereby increasing receiver noise and decreasing range performance. In the present invention we utilize the unique approach of using a low frequency carrier, i.e., approximately 100 MHz to impose the encoded or chirped signal. This allows operation of the receiver at lower frequencies where the system noise is less severe and thereby increases the range performance.

In present pulsed laser radar systems, solid state and molecular gas lasers are used to generate the laser beam for tactical range finding applications. These devices, however, are bulky and require large cooling systems which increase system weight, which is undesirable, especially in airborne systems.

At a fraction of the weight and cost of these devices, the semiconductor laser diode is clearly superior. Semiconductor laser diodes, however, are inherently peak power and duty cycle limited due to the thermal recovery required by the active volume of the semiconductor laser. This, in turn, limits the average output power of the transmitter. The present use of a pulsed semiconductor laser radar is inherently limited in its detection range due to the thermal recovery required by the laser transmitter.

For example, present pulsed time-of-flight semiconductor radar systems utilize the pulse delay ranging technique for range measurement. By far, this is the most widely used method of range measurement because it is simple and can be extremely accurate. Basically, when the laser radar's transmission is pulsed, the range of a target can be directly determined by measuring the time between the transmission of each pulse and reception of the echo from the target. The round-trip transit time is divided by two to obtain the time the pulse took to reach the target. This time, multiplied by the speed of light, is the target's range. Using this type of system, if both long detection range and fine range resolution are desired, extremely narrow pulses of exceptionally high peak power must be transmitted. But, due to the inherent physical limits of the semiconductor laser, there are practical limits on the level of peak power available. Thus, the pulsed time-of-flight semiconductor laser radar systems are inherently limited in detection range and range resolution.

SUMMARY OF THE INVENTION

The laser radar system of the present invention is particularly suitable for systems where overall system weight is crucial. The laser radar system of the present invention contemplates the use of a semiconductor laser diode to generate a laser beam for measuring the range of a target from the radar system. Prior to transmission, the beam is modulated at an RF frequency according to a pulse compression technique, i.e., linear frequency modulation, pulse code modulation, binary phase modulation or polyphase modulation. The received echoes are passed through a filter which compresses the received pulse. The use of the laser pulse compression technique results in long detection range, fine range resolution and a sufficiently small beam suitable for detecting relatively small targets.

The present invention contemplates a novel laser radar system which utilizes pulse compression technique in the RF frequency while the energy is centered about an optical carrier frequency realm for enhancing the detection range and range resolution of the radar system without exceeding peak power and average power limits.

A primary objective of the present invention is to provide a laser pulse compression radar system which utilizes a semiconductor laser for generating the encoded laser.

Another objective of the present invention is to provide a laser radar system which simultaneously has long detection range and fine range resolution.

Another objective of the present invention is to provide a laser radar system which requires little cooling for minimizing the overall system weight while providing range performance similar to those systems which utilize bulky, less efficient transmitters.

The above and other objectives and advantages of the invention will become more apparent upon reading the description of the invention in connection with the drawing described below.

BRIEF DESCRIPTION OF THE DRAWING

The single Figure is a diagram of the semiconductor laser pulse compression radar system of the present invention.

DETAILED DESCRIPTION OF THE INVENTION

As can be seen in the Figure, the semiconductor laser pulse compression radar system of the present invention utilizes two separate subsystems, one for providing a modulated laser signal for transmission, and one for demodulating the return signal for accessing the desired encoded information. The first of the subsystems is a transmitter 12 utilized to provide a laser beam at a preselected optical frequency and modulation for transmission. The second subsystem is a receiver 14 which receives the reflected light energy from the target and demodulates the returned light for detecting and locating the target. Each subsystem 12, 14 will be discussed individually below.

The transmitter 12 utilizes a number of components for producing, modulating and amplifying the light energy that may be radiated into free space. The transmitter 12 comprises a modulator 15, a semiconductor laser diode 16, a DC voltage bias power supply 22 and a transmitter telescope 18. The modulating unit 15 provides information in the form of the encoded pulses to the semiconductor laser diode 16, which generates the laser beam for transmission. The intensity of the laser beam is modulated in accordance with the information received from the modulator 15. The transmitter telescope 18 launches the laser beam into free space.

The receiver 14 comprises a number of components for receiving and demodulating the reflected radar return, or "echo" from a target 27. Basically, the receiver 14 comprises a receiver telescope 28, an avalanche photodiode/preamp 30, a high-voltage bias power supply 32, a demodulator 31 and a display 36. The reflected laser beam returned from the target 27 is received by the receiver telescope 28 which focuses the radiation on the avalanche photodiode/preamp 30. The avalanche photodiode/preamp 30 converts the received light to a current flow having the modulation of the received light. The demodulator 31 demodulates the current flow and compresses the pulses. The display 36 provides the results, in any desired fashion, to an observer.

In this manner, a semiconductor laser diode is modulated at radio frequencies to generate an encoded laser beam in a laser radar system which simultaneously has a long detection range and and fine range resolution by utilizing pulse compression. Although there are various pulse compression methods and embodiments to enhance the detection range and range resolution of a radar system, i.e., linear frequency modulation, pulse code modulation, and phase code modulation, one particular method and embodiment will be discussed in detail below with regard to the present invention. It should be noted that other methods and embodiments may be utilized without departing from the spirit and scope of the invention.

Referring again to the transmitter subsystem 12, in this particular embodiment, the modulator 15 comprises an RF current amplifier 20, a pulse expansion filter 24 and a pulse generator 26. In operation, the modulator 15 operates as follows: an operator-driven switch activates the pulse generator 26, which establishes the period and triggers the transmitted signal. The switch may be either manual or under computer control. The outgoing pulse feeds into the pulse expansion filter 24. The pulse expansion filter can be a surface acoustic wave (SAW) filter which superimposes the desired modulation onto the pulse train thereby providing expanded pulses having information encoded thereon. The expanded pulse feeds the RF current amplifier 20 for amplifying the less than 5 ma pulse to a level well above the semiconductor laser diode lasing threshold. This ensures that the light output follows the radio frequency current modulation.

The semiconductor laser diode 16 converts the input current modulation to light output. The semiconductor laser diode 16 is a directly driven radio frequency semiconductor laser diode. When the lasing threshold is exceeded, high-energy electromagnetic radiation is released as light waves. The light emitted from the laser is collected via an optically fast telescope 18, having a speed of less than f#/1.0, which minimizes the laser beam divergence and optical losses. Although a telescope is described and shown in the Figure, any type of collimator, i.e., an optical device that renders diverging or converging light rays parallel, may be used to focus the transmitted laser beam.

The receiver subsystem 14 comprises a number of components for receiving and demodulating the reflected laser beam return. A receiver telescope 28 collects the target reflected return and focuses it onto an active area of the avalanche photodiode/preamp 30. The avalanche photodiode/preamp 30 is a photodetecting diode which is sensitive to incident light energy and increases its electrical conductivity by exponentially increasing the number of electrons in its conduction band energy levels through absorption of received photons of energy, electron interaction, and applied bias voltage. A high voltage bias power supply 32 provides the bias voltage for maximizing the responsivity of the avalanche photodiode/preamp 30. The preamp portion of the avalanche photodiode/preamp 30 amplifies the output current to a practical level for demodulation. Thus, the avalanche photodiode/preamp 30 converts the photons of the incoming light signal to voltage via the current flow from the active area of the avalanche photodiode portion and amplifies the voltage via the transimpedance preamp portion of the avalanche photodiode/preamp 30.

The output of the avalanche photodiode/preamp 30 is provided to the demodulator 31. The demodulator 31 comprises a post-amplifier 34, and a pulse compression filter 35. The post-amplifier 34 accepts the low voltage signal from the avalanche photodiode/preamp 30 and amplifies the signal for input to the pulse compression filter 35. The amplification must be sufficiently high so that the pulse compression filter 35 does not attenuate the output to a level below which it cannot be properly processed.

The pulse compression filter 35 accepts the voltage representation of the received pulse and compresses it. The pulse compression filter must have a time-frequency characteristic which is the complex conjugate of the time-frequency characteristic of the pulse expansion filter. In other words, where the transmitted pulse is an FM chirp having a frequency which linearly increases during the length of the pulse, the pulse compression filter introduces a time lag that decreases linearly with frequency at the same rate as the frequency of the received pulse increases. Being of progressively higher frequency, the trailing portions of the received pulse take less time to pass through the filter than the leading portion. Successive portions thus tend to "bunch up". Consequently, when the pulse emerges from the pulse compression filter, its amplitude is much greater and its width is much less than when it entered thereby resulting in a compressed pulse.

If, for example, binary phase modulation is utilized to modulate the transmitted pulse, the transmitted pulse, in effect, is marked off into narrow segments of equal length. The modulating carrier is phase shifted by the selected increment, e.g., 180°, at specified segments according to a predetermined code. The received echoes at the output of the postamplifier 34 are passed through the pulse compressing filter which provides a time delay exactly equal to the duration of the uncompressed pulses. Thus, as the trailing edge of the echo enters the line, the leading edge emerges from the other end, thereby compressing the pulse.

In pulse code modulation (PCM), binary coding information having optimal correlation properties, e.g., a Barker code, is transmitted within each pulse. The return pulses, at the output of the postamplifier 34, are cross correlated with the transmitted pulses, that is, the time integral of the product of the two signals is taken, thereby resulting in a compressed pulse. The pulse compression filter 35 shown in the Figure must be selected to perform the specified function depending on which modulation technique is utilized.

The output of the pulse compression filter 35 is received by a display and counter circuit 36. The display and counter circuit 36 computes the range to the target by starting the range counter with the emission of the start pulse from the pulse generator 26, and stopping the range counter after the compressed echo exceeds a preset threshold. A suitable scale factor is applied to the measured time duration to display the actual range.

The extent to which the received pulses are compressed, i.e., the ratio of the uncompressed pulse width, $\tau$, to the compressed width $\tau_{comp}$, is called the pulse compression ratio. Because the compression ratio of the pulse compression filter 35 is known, the resulting pulse width, $\tau_{comp}$, is determined by the quotient of the encoded pulse duration, $\tau$, and the compression ratio of the filter.

In a similar manner, by conservation of energy, the peak amplitude of the compressed pulse is determined by increasing the peak amplitude of the uncompressed pulse by the square root of the compression ratio. The resulting pulse can therefore resolve targets on the order of the compressed pulse width, $\tau_{comp}$, and the absolute range performance is improved by the square root of the peak power.

An embodiment of the invention was assembled and tested. The pulse expansion filter and pulse compression filter were surface acoustic wave filters provided as a single unit by Phonon, Inc. The encoded wave form was a frequency modulated chirp centered at 58 MHz with a 17 us expanded pulse duration. The compression ratio was 170. This combination led to a 100 ns compressed pulse width. The laser used for this embodiment was a Spectra Diode Laboratories Model SDL-2410-H1, gain guided stripe laser emitting at approximately 830 nm. After coupling through a Melles Griot diode collimator, Model 06 GLC 002, 34 mW peak power out was measured at the laser surface.

Two separate targets at two different ranges were used for range measurement. Firstly, a whiteboard target was used with crosshairs in the center and a lambertian reflectivity of approximately 30%. The second target was a steel-reinforced stranded 69 kV power line with an average lambertian reflectivity of 25%. Both targets were located at 200 and 327 feet and the amplitude and time difference between transmit and echo pulse were measured on an oscilloscope. The time difference represents the range to the target.

The results of the experiment are shown in the Table I.

TABLE I

| | | Test Results | | |
|---|---|---|---|---|
| Range (ft) | Target | Measured Peak Signal (Volts, $V_{pm}$) | Predicted Peak Signal (Volts, $V_{ps}$) | Error % $/V_{pm} - V_{ps}/$ $V_{ps}$ |
| 200 | Whiteboard | .75 | .786 | 4.5 |
| | Wire | .2 | .18 | 10 |
| 327 | Whiteboard | .18 | .292 | 38 |
| | Wire | .06 | .046 | 31 |

Although this particular embodiment was used to test the semiconductor radar system of the present invention, other, substantially equivalent embodiments could be utilized which encompass the subject matter of the present invention.

Thus, the present invention utilizes the pulse compression technique in the laser realm to provide a laser radar system using a semiconductor laser for providing the light source. The semiconductor laser is clearly superior than other light sources, such as solid state or molecular gas lasers, as the semiconductor laser weighs a fraction of the alternative lasers. It is imperative that the overall system weight of the laser radar system be minimized for airborne applications such as long range and high velocity warhead fusing, airborne-based obstacle avoidance, short range satellite docking, RPV tracking, and long range space tracking. In addition to its significant weight advantage over other light sources, the semiconductor laser costs significantly less thereby providing economic advantage.

What is claimed is:

1. A radar system for detecting a target, comprising:
a semiconductor laser for generating light;
means, connected to said semiconductor laser for pulsing and modulating said light to form light pulses having a predetermined pulse width and amplitude;
means for launching said light pulses towards the target;
means for receiving portions of said light pulses reflected by the target;
means, connected to said receiving means, for demodulating said received portions of said light pulses such that said pulses are compressed and have a pulse width less than said predetermined pulse width and an amplitude greater than the amplitude of the received pulses; and
means, connected to said demodulating means and responsive to said demodulated portions, for producing an output signal.

2. A radar system as defined in claim 1, wherein said semiconductor laser is a continuous wave constant light output semiconductor laser diode.

3. A radar system as defined in claim 2, wherein said pulsing and modulating means comprises an electro-optical light modulator.

4. A radar system as defined in claim 1, wherein said semiconductor laser is a directly-driven radio frequency semiconductor laser.

5. A radar system as defined in claim 1, wherein said pulsing and modulating means comprises a pulse expansion filter having a preselected time-frequency characteristic.

6. A radar system as defined in claim 5, wherein said pulsing and modulating means further comprises a pulse generator.

7. A radar system as defined in claim 5, wherein said demodulating means comprises a pulse compression filter having a time-frequency characteristic which is the complex conjugate of said pulse expansion filter time-frequency characteristic.

8. A radar system as defined in claim 1, wherein said pulsing and modulating means modulates said light so that the frequency of each pulse is increased at a constant rate throughout its width.

9. A radar system as defined in claim 8, wherein said demodulating means demodulates said received portions by introducing a time lag that decreases linearly with the frequency at said constant rate.

10. A radar system as defined in claim 8, wherein said modulating means comprises a surface acoustic wave filter for providing a frequency modulated chirp.

11. A radar system as defined in claim 1, wherein said pulsing and modulating means modulates said light so that the phase of the pulses is modulated in finite increments.

12. A radar system as defined in claim 11, wherein said finite increments are 0 degrees and 180 degrees.

13. A radar system as defined in claim 11, wherein said demodulating means comprises a pulse compression filter which provides a time delay equal to said predetermined pulse width.

14. A radar system as defined in claim 1, wherein said demodulating means comprises means for generating an electrical current flow corresponding to said received portions.

15. A radar system as defined in claim 14, wherein said electrical current flow generating means comprises an avalanche photodiode which converts the incoming light pulses to an electrical current flow.

16. A radar system as defined in claim 15, wherein said demodulating means further comprises a high voltage bias power supply connected to said avalanche photodiode for applying a bias voltage thereto.

17. A radar system as defined in claim 15, wherein said demodulating means further comprises a preamplifier connected to said avalanche photodiode for amplifying the output thereof.

18. A radar system as defined in claim 17, wherein said demodulating means further comprises a postamplifier, connected to the output of said preamplifier, for amplifying the output thereof.

19. A radar system as defined in claim 1, wherein said launching means comprises a transmitter telescope.

20. A radar system as defined in claim 1, wherein said receiving means comprises a receiver telescope.

21. A radar system as defined in claim 1, wherein said pulsing and modulating means phase modulates said light according to a predetermined code and said demodulating means comprises a delay line which provides a time delay equal to the duration of the launched pulses.

22. A radar system as defined in claim 1, wherein said pulsing and modulating means modulates said light so that binary coding information is transmitted within each pulse and said demodulating means comprises means for cross correlating said launched light pulses with said received portions.

* * * * *